United States Patent Office 3,657,262
Patented Apr. 18, 1972

3,657,262
HOMO- AND COPOLYMERS OF 4 - VINYL-4-
METHYL-AZETIDINONE-2 AND PROCESS
FOR THEIR MANUFACTURE
Herbert Bestian, Frankfurt am Main, Eduard Kaiser, Kelkheim, Taunus, and Helmut Korbanka, Hofheim, Taunus, Germany, assignors to Farbwerke Hoechst Aktiengesellschaft vormals Meister Lucius & Bruning, Frankfurt am Main, Germany
No Drawing. Filed Oct. 13, 1969, Ser. No. 865,970
Claims priority, application Germany, Oct. 25, 1968,
P 18 05 046.9
Int. Cl. C08f 7/12, 19/00
U.S. Cl. 260—30.3 R                    5 Claims

ABSTRACT OF THE DISCLOSURE

Homo- and copolymers of 4-vinyl-4-methyl-azetidinone-are provided for which are polymerized at the vinyl group in the presence of free radical initiators and carry lateral lactam rings.

---

The present invention relates to homo- and copolymers of 4-vinyl-4-methyl-azetidinone-2 in which the macromolecular main chain is free from nitrogen atoms and cannot be split by saponification, and to a process for the manufacture of the said polymers.

Homo- and copolymers of N-vinyllactams, for example of the formula

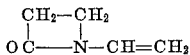

and processes for their manufacture are known in the art. The said N-vinyllactams are rather stable compounds which can be handled at elevated temperature and thus also homo- and copolymerized at the vinyl group. In the polymerization the lactam ring is maintained even with rings of high ring tension, for example in the cast of a 4-membered ring. This stability can be attributed to the substitution of the nitrogen atom.

4-membered lactams in which the nitrogen atom does not carry a substituent and which have the formula

are very unstable. The 4-methyl-azetidinone-2, for example, is substantially transformed in the distillation at atmospheric pressure into the polymeric amide of the nylon-3 type with cleavage of the 4-membered ring.

Polymers of 4-vinyl azetidinone-2 of the formula

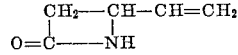

having amide linkages in the macromolecular chain have also been proposed.

In contradistinction thereto, polymers of 4-vinyl-4-methyl-azetidinone-2, a homologue of 4-vinyl-azetidinone-2, having amide linkages in the macromolecular main chain have not yet been prepared.

A general synthesis for lactams having 4-membered rings and used as starting compounds has been described in Liebigs Ann. Chem. 661 (1963) 111. In this manner 4-vinyl-azetidinones may also be prepared.

The present invention provides homopolymers of 4-vinyl-4-methyl-azetidinone-2 and copolymers consisting of 99 to 0.5% by weight, preferably 30 to 2% of 4-vinyl-4-methyl-azetidinone-2 and 1 to 99.5% by weight, preferably 70 to 98% of other polymerizable ethylenically unsaturated compounds, in which homo- and copolymers the macromolecular main chain exclusively consists of —C—C— linkages and carries lateral azetidinone rings of the following structure

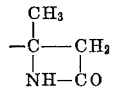

The present invention also provides a process for the manufacture of nitrogen-containing polymers, more particularly homo- and copolymers, by polymerizing 4-membered lactams in the presence of free radical initiators, which comprises using 4-vinyl-4-methyl-azetidione-2 as 4-membered lactam.

The homopolymers according to the invention can be defined as
(a) poly(4-vinyl-4-methyl-azetidinone-2),
(b) poly(4-vinyl-4-methyl-azetidinone-2) the macromolecular main chain of which is free from nitrogen atoms,
(c) poly(4-vinyl-4-methyl-azetidinone-2) the macromolecular main chain of which cannot be split by saponification,

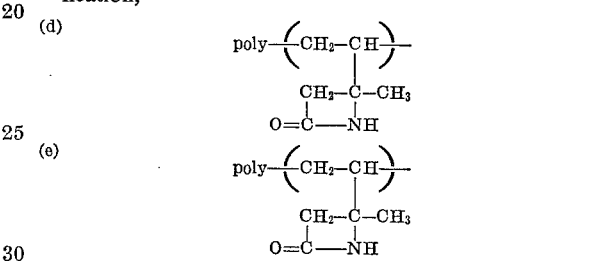

having an average molecular weight corresponding to an intrinsic viscosity [η] of from 0.02 to 0.5 dl./g., measured in dimethyl formamide at 25° C.
(f) poly(4-vinyl-4-methyl-azetidinone-2) the main chain of which consists of —C—C— linkages, or
(g) poly(4-vinyl-4-methyl-azetidinone-2) the main chain of which contains amide linkages.

The copolymers according to the invention can be defined as follows:
(h) copolymers consisting of 99 to 0.5% by weight of 4-vinyl-4-methyl-azetidinone-2 structural units and 1 to 99.5% by weight of structural units of at least one other polymerizable ethylenically unsaturated compound or
(i) copolymers consisting of 99 to 0.5% by weight of 4-vinyl-4-methyl-azetidinone-2 structural units and 1 to 99.5% by weight of structural units of at least one other polymerizable ethylenically unsaturated compound, in which copolymers the main chain consists of —C—C— linkages.

Copolymers according to the invention of 4-vinyl-4-methylazetidinone-2 and ethylene, styrene, acrylonitrile, vinyl acetate or vinyl propionate as further polymerizable compound can be defined as follows:

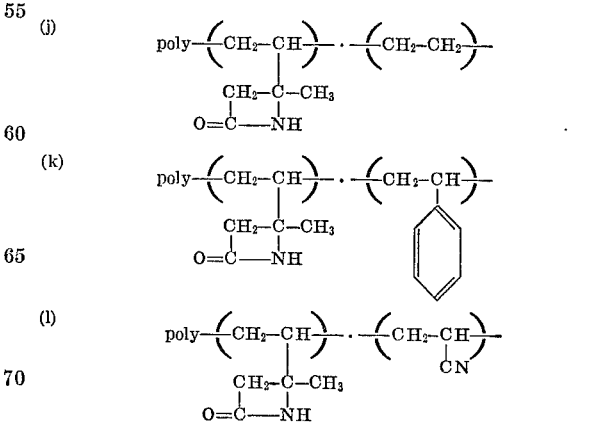

(m)
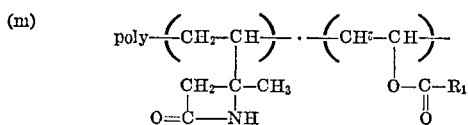

in which $R_1$ stands for $CH_3$ or $C_2H_5$.

Terpolymers according to the invention, for example of 4-vinyl-4-methyl-azetidinone-2, ethylene and unsaturated acids such as crotonic acid, acrylic acid or methacrylic acid may be characterized not only by definition (h) and (i) but also by the following formula

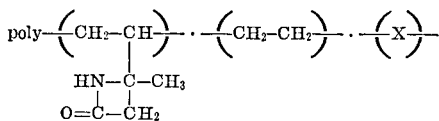

in which X may have the following meaning (1)
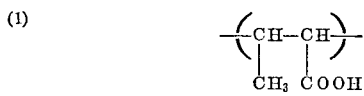

crotonic acid structural unit (2)

acrylic acid structural unit (3)
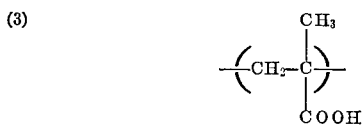

methacrylic acid structural unit.

The polymerization may be carried out in bulk or in the presence of solvents or diluents as solution or precipitation polymerization and also as dispersion polymerization, either continuously or discontinuously. As solvents or diluents there may be used all liquids which do not prevent polymerization. Especially suitable are aliphatic and aromatic hydrocarbons, alcohols, ketones, halogenated hydrocarbons, esters, ethers, and amides, for example hexane, benzene, toluene, methanol, isopropanol, tert. butanol, acetone, methyl acetate, ethyl acetate, tetrahydrofurane, dioxane, dimethyl formamide, dimethyl sulfoxide, water, as well as mixtures of these substances.

The copolymers of 4-vinyl-4-methyl-azetidinone-2 and other copolymerizable compounds are prepared from 0.5 to 99% by weight, preferably 2 to 30% by weight of 4-vinyl-4-methylazetidinone-2 and 99.5 to 1% by weight, preferably 98 to 70% by weight of at least one further copolymerizable ethylenically unsaturated compound. Comonomers of this type are, for example, unsaturated hydrocarbons, vinyl halides, vinyl esters, vinyl ethers, unsaturated acids, the anhydrides, esters and amides thereof, unsaturated nitriles, N-vinyl amides and N-vinyl lactams, such as ethylene, butadiene, styrene, vinyl chloride, vinylidene chloride, vinyl acetate, vinyl isobutyl ether, acrylic acid, methacrylic acid, crotonic acid, maleic anhydride, acrylic acid methyl ester, acrylic acid 2-ethylhexyl ester, methacrylic acid methyl ester, acryl amide, acrylonitrile, N-vinyl-N-methyl-acetamide, N-vinyl-N-methyl foramide, N - vinyl-pyrrolidone, N-vinyl-caprolactam, vinyl-sulfonamide and the like.

The polymerization is carried out at a temperature below 250° C. It proved advantageous to choose as low as possible a temperature. The homopolymerization as well as the copolymerization with most of the comonomers can be performed at a temperature in the range of from 0 to 120° C. When ethylene is used as comonomer, possibly together with further comonomers, it is advantageous to operate at a temperature in the range of from 100 to 200° C. to obtain high polymerization rates. The polymerization is carried out at atmospheric pressure or elevated pressure. It is expedient to operate under elevated pressure when comonomers are used the boiling point of which is below the chosen reaction temperature. With ethylene as comonomer it is necessary to use high pressure in the range of from 10 to 4000 atmospheres, preferably 300 to 2500 atmospheres.

To initiate the polymerization all substances can be used that form radicals under the reaction conditions, such as peroxides, acyl peroxides, per-esters, hydroperoxides, aliphatic azo compounds, persulfates, hydrogen peroxide; peroxides, for example di-tertiary butyl peroxide and azo compounds, for example azobisisobutyronitrile being preferred. It is likewise possible to use redox systems.

Poly(4 - vinyl-4-methyl-azetidinone-2) is a hard and brittle solid which is soluble in dimethyl formamide, dimethyl sulfoxide, 4 - vinyl-azetidinone-2, and in aqueous acetonitrile, tetrahydrofurane and butyrolactone, and insoluble in hexane, acetone, ether and methanol. The polymer has a softening point above 170° C. and forms a viscous melt at a temperature of from 200 to 250° C.

The homopolymers have an average molecular weight of from 1000 to 50,000, preferably 1000 to 20,000, whereas the copolymers have an average molecular weight in the range of from 10,000 to 1,000,000, preferably 10,000 to 200,000.

The molecular weight is determined in the lower range by the cryoscopic method and in the higher range by the osmotic method. As measurement for the molecular weight there is generally taken the intrinsic viscosity [$\eta$]. The products according to the invention have an intrinsic viscosity of from 0.02 to 5 dl./g., preferably 0.03 to 3.0 dl./g.

A measurement for the dispersity of molecular weight is the ratio of $M_w$ to $M_n$, wherein $M_w$ is the weight average of the molecular weight, determined by light scattering, and $M_n$ is the number average of the molecular weight, determined by osmometry. $M_w/M_n$ may be in the range of from 1.5 and 20, preferably 2 and 10, lower values indicating a higher uniformity than higher ones. The ratio of $M_w$ to $M_n$ can be influenced within certain limits by the temperature, the course of temperature, the conversion and by adding substances having a regulating effect.

The copolymers according to the invention represent statistical copolymers in the sense of the copolymerization theory (cf. L. Küchler "Polymerisationskinetic," Springer Verlag, Berlin 1951, pages 160 et seq.). The formation of block polymers in which long sequences of 4-vinyl-4-methylazetidinon-structural units alternate with long sequences of structural units of another monomer are improbable.

A characteristic property of the homo- as well as the copolymers is the high reactivity of the lactam ring. By acid and alkaline hydrolysis the salts of $\beta$-aminocarboxylic acids are obtained, acid alcoholysis yields the salts of $\beta$-amino acid esters and the aminolysis leads to $\beta$-amino acid amides.

The products according to the invention can be used as such without further chemical reaction for the manufacture of lacquers.

The following examples serve to illustrate the invention, the parts and percentages being by weight unless otherwise stated.

EXAMPLE 1

In a flask provided with reflux condenser and nitrogen blanket 50 parts of 4-vinyl-4-methyl-azetidinone-2, 1.6 parts of azobisisobutyronitrile were purged with pure nitrogen and heated for 100 hours at 70° C. Either was added to the weakly yellow polymer solution whereupon 5 parts of a colorless to weakly yellow solid were obtained, corresponding to a conversion of 10%. The solid had the following properties:

*Elementary analysis.*—C, 65.0%, H, 8.3%, N, 12.9%. Softening point, 170° C.

The polymer was soluble in dimethyl formamide, dimethyl sulfoxide, butyrolactone and insoluble in benzene, hexane and ether.

Characteristic IR bands at 3240, 1748, 1650, 1510 cm.$^{-1}$, intrinsic viscosity 0.082 dl./g., measured in dimethylformamide at 25° C. The main chain of the polymer contained —C—C— linkages.

EXAMPLE 2

A mixture of 400 milliliters of methyl acetate and 57 grams of 4-vinyl-4-methyl-azetidinone-2 was introduced into an autoclave provided with stirrer. The air in the autoclave was replaced by ethylene, the autoclave was heated at 140° C. and the ethylene pressure was raised to 2000 atmospheres. By means of a dosing pump a solution of 0.2 grams of azobisisobutyronitrile and 5 grams of methacrylc acid in 200 milliliters of methyl acetate was introduced into the autoclave over a period of 80 minutes, while the ethylene pressure was maintained at 1800 to 2000 atmospheres and the temperature at 130 to 140° C. After pressure release, 430 grams of a copolymer having a content of 4-vinyl-4-methyl-azetidinone-2 structural units of 7.5% and of methacrylic acid structural units of 0.637% (acid number 4.14 mg. KOH/g.) were obtained.

The copolymer had an intrinsic viscosity of 1.07 dl./g., measured in xylene at 85° C., a density of 0.929 g./ml. at 20° C. and a penetration of $0.7 \times 10^{-1}$ mm. according to DIN 51 579. The product contained —C—C—linkages in the main chain.

EXAMPLE 3

In a nitrogen atmosphere a solution of 0.3 part of potassium pyrrolidone in 25 parts of dimethyl sulfoxide was added to a mixture of 25 parts of 4-vinyl-4-methyl-azetidinone-2, 50 parts of dimethyl sulfoxide and 0.028 part of oxalyl pyrrolidone. Polymerization set in after a few minutes. To dissipate the reaction heat the reaction flask was cooled with water. The content of the flask solidified to a colorless gel which was introduced after 30 minutes into methanol with stirring, and filtered. After repeated washing with methanol the product was dried at 60° C. under reduced pressure. 20 parts of a colorless powder were obtained.

The product was soluble in concentrated sulfuric acid and formic acid of 80% strength. In the infrared spectrum the following bands were observed: at 1640 cm.$^{-1}$, 1525 cm.$^{-1}$ (amide bands I and II), 984 cm.$^{-1}$, 916 cm.$^{-1}$ (vinyl group).

What is claimed is:

1. A homopolymer of 4-vinyl-4-methyl-azetidinone-2 having a main chain which consists of —C—C— linkages and has lateral azetidinone rings of the formula

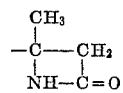

said polymer having an average molecular weight of 1,000 to 50,000 and an intrinsic viscosity of from 0.02 to 5 dl./g., measured in dimethyl formamide at 25° C.

2. A process for making homopolymers of 4-vinyl-4-methyl-azetidinone-2 which comprises polymerizing said azetidinone in the presence of a free radical polymerization initiator at a temperature of 0 to 120° C. to produce a homopolymer having a main chain consisting of —C—C— linkages and having an average molecular weigtht of 1,000 to 50,000.

3. A linear random addition copolymer consisting of 99 to 0.5% by weight of 4-vinyl-4-methyl-azetidinone-2 structural units and 1 to 99.5% by weight of structural units of at least one ethylenically unsaturated monomer copolymerizable with said azetidinone, said copolymer having a main chain consisting of —C—C— linkages and a molecular weight of 1,000 to 1,000,000.

4. A linear random addition copolymer having a main chain consisting of —C—C linkages, said copolymer consisting essentially of 99 to 0.5% by weight of 4-vinyl-4-methyl-azetidinone-2 structural units and 1 to 99.5% by weight of structural units of at least one ethylenically unsaturated monomer copolymerizable with said azetidinone, said copolymer having lateral azetidinone rings of the following formula

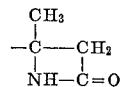

and a molecular weight of 1,000 to 200,000.

5. A process for making linear random addition copolymers which comprises copolymerizing 99 to 0.5% by weight of 4-vinyl-4-methyl-azetidinone-2 and 1 to 99.5% by weight of at least one ethylenically unsaturated compound copolymerizable with said azetidinone in the presence of a free radical polymerization initiator at a temperature of 0 to 250° C. and a pressure between atmospheric pressure and 4,000 atmospheres to form a copolymer having a main chain consisting of —C—C— linkages and having a molecular weight of 1,000 to 1,000,000.

References Cited

UNITED STATES PATENTS 3,153,640   10/1964   Barnum et al. _____ 260—86.1

OTHER REFERENCES

CA 67, 82907 (w).
CA 69, 106353 (g).
CA 70, 88440 (x).

JOSEPH L. SCHOFOR, Primary Examiner

S. M. LEVIN, Assistant Examiner

U.S. Cl. X.R.

260—78 L, 78.5 R, 79.7, 80.3 E, 80.3 N, 80.72, 82.1, 85.5 R, 85.7, 6.1 N, 87.5 E, 87.7, 88.1 R, 88.1 PA, 88.3 L